(12) United States Patent
Flaxl

(10) Patent No.: US 6,807,400 B2
(45) Date of Patent: Oct. 19, 2004

(54) BATTERYLESS TRANSPONDER

(75) Inventor: Thomas J. Flaxl, Dachau (DE)

(73) Assignee: Texas Instruments Deutschland GmbH, Freising (DE)

( * ) Notice: Subject to any disclaimer, the term of this patent is extended or adjusted under 35 U.S.C. 154(b) by 411 days.

(21) Appl. No.: 10/118,175

(22) Filed: Apr. 8, 2002

(65) Prior Publication Data

US 2002/0160713 A1 Oct. 31, 2002

(51) Int. Cl.$^7$ ............................................. H04B 5/00
(52) U.S. Cl. ................................. 455/41.1; 340/10.1
(58) Field of Search ......................... 455/41.1, 127.1, 455/343.1, 572, 573; 340/505, 10.1, 10.42; 379/55.1

(56) References Cited

U.S. PATENT DOCUMENTS 6,154,635 A * 11/2000 Ohta .......................... 455/41.1
6,167,236 A * 12/2000 Kaiser et al. ............... 455/41.1

\* cited by examiner

*Primary Examiner*—Lee Nguyen
(74) *Attorney, Agent, or Firm*—Bret J. Petersen; W. James Brady, III; Frederick J. Telecky, Jr.

(57) ABSTRACT

A batteryless transponder (10) which acquires its supply energy in that it rectifies an RF interrogation pulse transmitted by an interrogation device during a reception phase and that it uses the direct current so obtained to charge a storage device which serves as a supply voltage source during a transmission phase. In response to the reception of the RF interrogation pulse, the transponder transmits the information stored in it, wherein the coil of a tuned circuit serves as an antenna for both the reception of the interrogation pulse and the transmission of the information. The transponder contains a controllable switching device (14, 16, 18, 20, 22) which disconnects the tuned circuit (26) from the supply source during the transmission phase, and connects it to the supply voltage source only for a duration which is short as compared with a quarter period of the resonant oscillations, depending on the occurrence of each oscillation minimum of the resonant oscillations.

5 Claims, 2 Drawing Sheets

BATTERYLESS TRANSPONDER

FIELD OF THE INVENTION

The invention relates to a batteryless transponder which, in its reception phase, acquires its supply energy by the rectification of an RF interrogation pulse transmitted by an interrogation device and then stores it in a storage element serving as a supply voltage source during the transmission phase, and which, in response to the reception of the RF interrogation pulse, transmits information stored in it, wherein the coil of a tuned circuit serves as an antenna for both the reception of the interrogation pulse and the transmission of the information stored.

BACKGROUND OF THE INVENTION

A transponder of this kind is known from EP 0 301 127 B1. When this known transponder has received an RF interrogation signal via its tuned circuit, which by rectification caused the charging of a capacitor, serving as a storage element, a supply voltage for the transponder then becomes available at this capacitor. The transponder recognises the termination of the interrogation pulse and causes a switch to close, by which the voltage being available at the capacitor is applied to the tuned circuit of the transponder. The closure of the switch is only of short duration, so that energy is supplied to the tuned circuit for the purpose of inducing resonant oscillations. Once the switch is opened, oscillations in the tuned circuit continue at an aperiodically decreasing amplitude. In order to maintain the resonant oscillations, the switch is again briefly closed after a predetermined number of oscillation periods, such as eight oscillation periods, for the purpose of supplying new energy to the tuned circuit and so to maintain the oscillations. This can be continued to the point when there is no longer sufficient energy available in the capacitor serving as the storage element to maintain oscillations. The circuit arrangement for the supply of energy to the tuned circuit is realised in such a way that, when the switch closes, the tuned circuit is connected directly in parallel to the storage element. The consequence of this is that the peak voltage of the resonant oscillations can never assume more than double the value of the supply voltage available at the storage element. The maximum field strength that can be reached when transmitting the information stored in the transponder, a process initiated by the induced resonant oscillations, is therefore limited, which, of necessity, also leads to a limitation of the reception range within which the information transmitted can still be received with a suitable receiver.

SUMMARY OF THE INVENTION

The invention enables a batteryless transponder of the type mentioned above obtain a higher field strength, and therefore a greater range for the information transmitted.

According to an embodiment of the invention, this improvement is achieved by providing a controllable switching device, which disconnects the tuned circuit from the supply voltage source during the transmission phase, and connects it to the supply voltage source only for a duration which is short as compared with a quarter period of the resonant oscillations, depending on the occurrence of each oscillation minimum of the resonant oscillations.

In the case of the transponder according to an embodiment of the invention, the tuned circuit is no longer hard-connected to the supply source during the transmission phase, so that the amplitude of its oscillations is not limited to a value double that of the supply voltage. Instead, after having been supplied with energy by a brief connection with the supply source, the tuned circuit is allowed to oscillate freely, so that an oscillation amplitude greater than double the supply voltage results, on account of the Q-factor. As a result of this increased oscillation amplitude, the desired reception range of the signal transmitted by the tuned circuit is correspondingly enhanced.

BRIEF DESCRIPTION OF THE DRAWINGS

The invention shall now be explained in exemplified form with reference to the drawing, where.

DETAILED DESCRIPTION OF THE INVENTION

Figure 1:
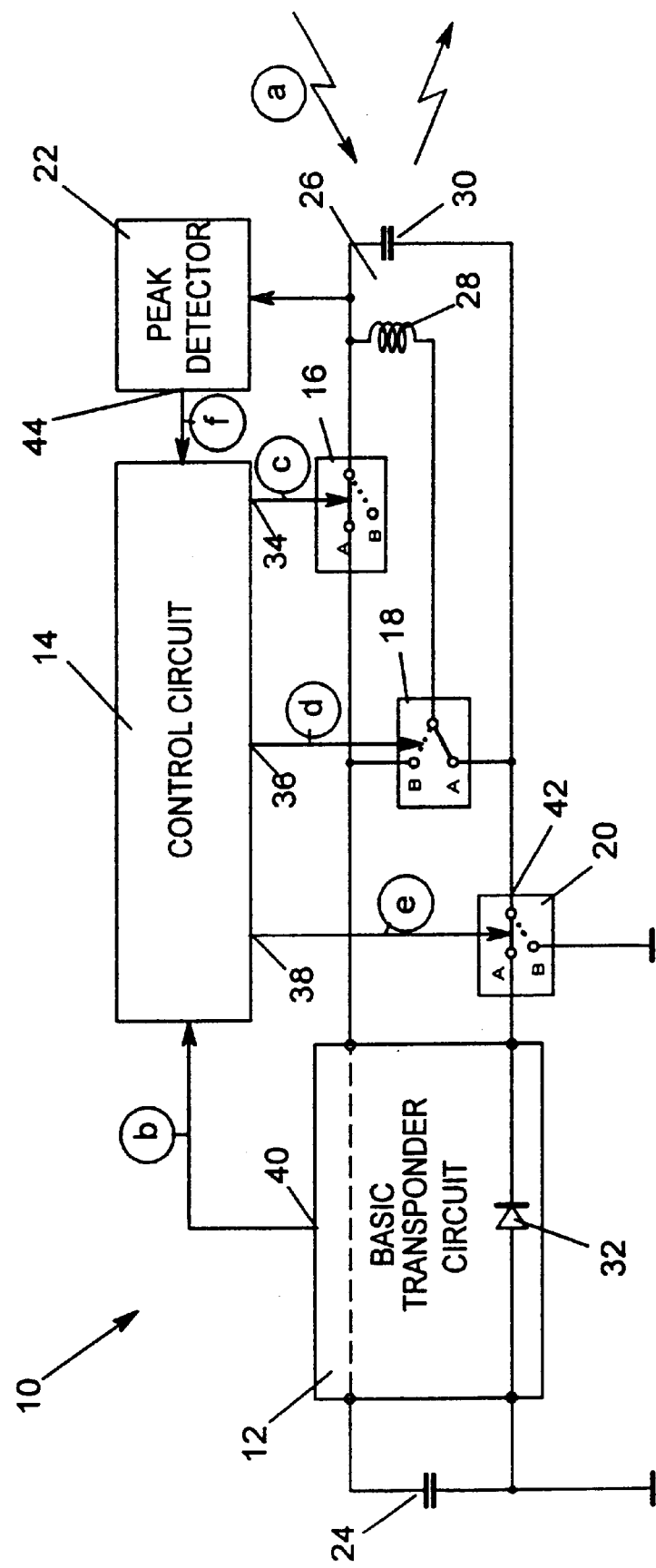
FIG. 1 is a schematic diagram of the transponder according to the invention, with the controllable switching device.

The batteryless transponder 10, represented in FIG. 1, contains a basic transponder circuit 12, which essentially contains all the components of the transponder known from EP 0 301 127 P1. The transponder 10 furthermore contains a controllable switching device with a control circuit 14, three switches 16, 18 and 20, controlled by this control circuit 14, as well as a peak detector 22. The transponder 10 furthermore contains a capacitor 24 which serves as a storage element for the energy required for the operation of the transponder, as well as a tuned circuit 26 with a coil 28 and a capacitor 30.

The transponder 10 can, for example, be used for the identification of an object to which it is firmly attached. To this end, the transponder must contain a storage device to store the information which positively identifies the object in question. To retrieve the information stored in the transponder, an interrogation cycle must be executed in the following way:

An interrogation device, here not represented, transmits an RF interrogation pulse, which is received by the coil 28 of the tuned circuit 26, acting as an antenna, and is then rectified by a rectifier 32 which forms part of the basic circuit of the transponder. The voltage obtained by this rectification process is used to charge the capacitor 24, which then functions as the supply voltage source for the transponder.

In this reception phase, the control circuit 14 supplies signals at its outputs 34, 36 and 38, which keep the switches 16, 18 and 20, respectively, in the position marked A in FIG. 1. As soon as the basic transponder circuit 12 detects the end of the RF interrogation pulse, it outputs a signal at its output 40, which causes the control circuit 14 to take the switches 16, 18, 20 into the position required for the transmission phase. This means specifically that switch 16, which is an off-switch, is taken into position B where the tuned circuit 26 is disconnected from the supply voltage source. At the same time, the control circuit 14, by virtue of a signal supplied from its output 38, takes the change-over switch 20 from position A to position B whereby, in this position, the output 42 is connected to ground. A control signal from output 36 of the control circuit 14 takes the change-over switch 18 into position B for a duration that is short as compared with a quarter of the duration of a period of the resonant frequency oscillations of the tuned circuit 26.

From FIG. 1 it can be seen that in position B of the change-over switch 18, the tuned circuit 26 is connected, for this short duration, to the supply voltage available at the capacitor 24, which means that the tuned circuit 26 is supplied with energy during this space of time. At the end of this short period of time, the control circuit 14 once again returns the change-over switch 18 to position A, whereby the tuned circuit 26 is disconnected from the supply voltage source. By virtue of the energy supplied to it, the tuned circuit 26 then freely oscillates at its resonant frequency, whereby, on account of its Q-factor, a maximum oscillation amplitude is reached which is greater than the supply voltage applied to it when the change-over switch 18 was in position B.

As soon as the oscillation amplitude reaches its lowest peak value, this is detected by the peak value detector 22, which then outputs a corresponding signal from its output 44 to the control circuit 14. This once again causes the control circuit 14 to output a control signal from its output 36, which again takes the change-over switch 18 for a short period of time to its position B. The tuned circuit 26, therefore, is once more supplied with energy when the peak value of its oscillation amplitude is reached. Since this switch-over process is caused by the peak detector 22 whenever the lower amplitude peak of the resonant oscillations is reached, this automatically results in the synchronisation of the switch-over processes of the change-over switch 18 with the resonant frequency of the tuned circuit 26. The tuned circuit 26 therefore oscillates at its resonant frequency and is supplied with new energy via the change-over switch 18 whenever it reaches the lowest extreme value of its oscillation amplitude.

Figure 2:
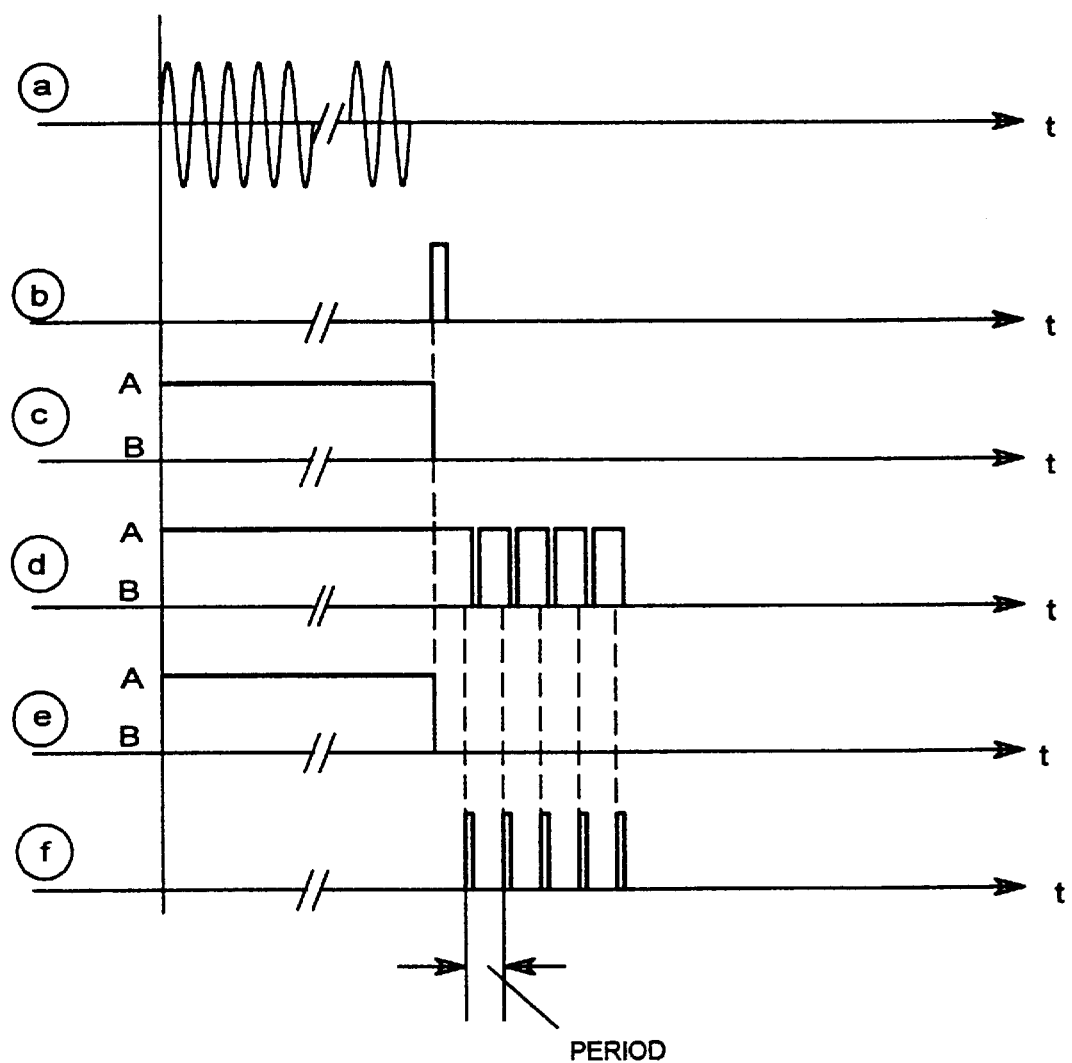
FIG. 2 is a diagram showing the signals present at the individual points of the circuit of FIG. 1.

FIG. 2, at a, schematically shows the RF interrogation pulse, which on rectification by the rectifier 32 causes the capacitor 24 to charge up. The pulse indicated at b signals the ending of the RF interrogation pulse to the control circuit 14. At that point, the output signal at output 34 of the control circuit 14 changes from its high signal value to its low signal value, which causes the switch 16 to go into position B and so to disconnect the tuned circuit from the supply voltage source. The switch 20 is also taken to its position B when the control signal at output 38 changes to its low signal value, as shown at e.

As is apparent from d, the control signal at output 36 once again assumes its high signal value after a short period of time and so causes the change-over switch 18 to return to its position A. As has already been mentioned above, an energy transfer to the tuned circuit 26 takes place when the change-over switch 18 is in its position B, so that this starts to oscillate freely once the change-over switch 18 returns to its position A. The peak detector 22 detects the occurrence of the first oscillation minimum and outputs a corresponding pulse from its output 44 to the control circuit 14, as can be seen at f in FIG. 2. This pulse causes the momentary change-over of the change-over switch 18 into its position B, when the processes described repeat periodically at the clock cycle rate of the resonant frequency of the tuned circuit 26. The oscillations of the tuned circuit 26 can, of course, only be maintained as long as there is sufficient energy stored in the capacitor 24.

Since, as has already been mentioned above, the tuned circuit 26 is allowed to oscillate completely freely when the switch 16 is in position B, the switch 18 in position A, and the switch 20 in position B, the outcome is that, depending on the Q-factor of the tuned circuit, an oscillation amplitude can be achieved which is greater than double the value of the supply voltage available at the capacitor 24. Because of this increased oscillation amplitude, a greater reception range of the signal transmitted by the coil 28 of the tuned circuit 26 will be achieved. By means of circuit elements in the basic transponder circuit 12, not represented in FIG. 1, the resonant frequency of the tuned circuit 26 can be changed to suit the information to be transmitted, so that, for example, an FSK modulation of the transmitted signal results, which can then be demodulated in the interrogation device for the purpose of extracting the information transmitted.

What is claimed is:

1. A Batteryless transponder which, in its reception phase, acquires its supply energy by the rectification of an RF interrogation pulse transmitted by an interrogation device and then stores it in a storage element serving as a supply voltage source during the transmission phase, and which, in response to the reception of the RF interrogation pulse, transmits information stored in it, wherein the coil of a tuned circuit having a resonant oscillation frequency serves as an antenna for both the reception of the interrogation pulse and the transmission of the information, characterized by a controllable switching device (14, 16, 18, 20, 22) which disconnects the tuned circuit (26) from the supply voltage source during the transmission phase, and connects it to the supply source only for a duration which is short as compared with a quarter period of the resonant oscillation frequency.

2. The batteryless transponder according to claim 1, whereby the controllable switching device disconnects the tuned circuit depending on the tuned circuit reaching an oscillation amplitude minimum.

3. The Batteryless transponder according to claim 1, whereby the controllable switching device contains three switches (16, 18, 20), the first one of which (16) being an off-switch which is connected between one terminal of the tuned circuit (26) and the supply voltage source, the second one (18) being a first change-over switch with two positions which, in the reception phase, connects the other terminal of the tuned circuit (26) to a rectification device used to rectify the RF interrogation pulse, in its first position, and, in the transmission phase, connects it to ground, in its second position, and the third one (20) being a second change-over switch with two positions, which is connected into the tuned circuit (26) in such a way that, in the reception phase and in its first position, the tuned circuit (26) forms a parallel resonant circuit, and in the transmission phase and in its second position it forms a series resonant circuit between the supply voltage source and ground, and that the switching device furthermore contains a control circuit (14) which, in response to the reception of a signal indicating the termination of the RF interrogation pulse, generates switching signals which take both the off-switch and the first change-over switch into their second positions and apply a switching signal for its activation to the second change-over switch.

4. The batteryless transponder according to claim 3, whereby the controllable switching device disconnects the tuned circuit depending on the tuned circuit reaching an oscillation amplitude minimum.

5. The Batteryless transponder according to claim 3, whereby a peak value detector (22) is connected to the tuned circuit (26) which at every minimum of the resonant oscillations outputs a signal to the control circuit (14), which causes this to apply the switching signal to the second change-over switch.

* * * * *